(12) United States Patent
Davis

(10) Patent No.: US 10,023,473 B2
(45) Date of Patent: Jul. 17, 2018

(54) FULL-FLOW WASTEWATER SEWER SYSTEMS

(71) Applicant: Rufus Davis, Houston, TX (US)

(72) Inventor: Rufus Davis, Houston, TX (US)

(*) Notice: Subject to any disclaimer, the term of this patent is extended or adjusted under 35 U.S.C. 154(b) by 4 days.

(21) Appl. No.: 13/748,383

(22) Filed: Jan. 23, 2013

(65) Prior Publication Data

US 2013/0209219 A1 Aug. 15, 2013

Related U.S. Application Data

(60) Provisional application No. 61/590,201, filed on Jan. 24, 2012.

(51) Int. Cl.
| | |
|---|---|
| *C02F 1/00* | (2006.01) |
| *E03F 3/02* | (2006.01) |
| *E03F 1/00* | (2006.01) |
| *E03F 5/22* | (2006.01) |

(52) U.S. Cl.
CPC .............. *C02F 1/00* (2013.01); *E03F 1/007* (2013.01); *E03F 3/02* (2013.01); *E03F 5/22* (2013.01); *Y10T 137/0324* (2015.04); *Y10T 137/7287* (2015.04); *Y10T 137/85986* (2015.04)

(58) Field of Classification Search
None
See application file for complete search history.

(56) References Cited

U.S. PATENT DOCUMENTS

| | | | | |
|---|---|---|---|---|
| 3,703,960 | A * | 11/1972 | Kennedy | E03F 5/22 |
| | | | | 141/284 |
| 3,805,817 | A * | 4/1974 | Smith | F16K 7/07 |
| | | | | 137/236.1 |
| 4,278,547 | A | 7/1981 | Reid | |
| 4,352,455 | A * | 10/1982 | Moser et al. | 237/12.3 R |
| 5,151,177 | A * | 9/1992 | Roshanravan et al. | 210/194 |
| 5,314,619 | A | 5/1994 | Runyon | |
| 5,467,322 | A * | 11/1995 | Walter | 367/142 |
| 5,643,454 | A | 7/1997 | Garrett et al. | |
| 6,125,633 | A * | 10/2000 | Strohmeyer, Jr. | 60/671 |
| 7,429,803 | B2 | 9/2008 | Davis | |
| 2002/0158011 | A1 | 10/2002 | Yamada | |
| 2004/0050429 | A1 * | 3/2004 | Aylward | E03B 1/04 |
| | | | | 137/597 |
| 2005/0016588 | A1 * | 1/2005 | Shimizu et al. | 137/205 |
| 2005/0156068 | A1 * | 7/2005 | Ivans | 239/723 |
| 2006/0076527 | A1 * | 4/2006 | Bush | E03D 3/06 |
| | | | | 251/30.01 |
| 2006/0091059 | A1 * | 5/2006 | Barbaro | B01D 24/04 |
| | | | | 210/341 |

OTHER PUBLICATIONS

PCT International Search Report and Written Opinion dated Mar. 29, 2013, in related International Application No. PCT/US2013/022808.

* cited by examiner

*Primary Examiner* — Richard C Gurtowski
(74) *Attorney, Agent, or Firm* — Haynes and Boone, LLP.

(57) ABSTRACT

A wastewater sewage system is disclosed. The sewage system includes a flow control valve that controls the flow of wastewater through the sewage system such that the sewage pipes in the sewage system are substantially full.

8 Claims, 7 Drawing Sheets

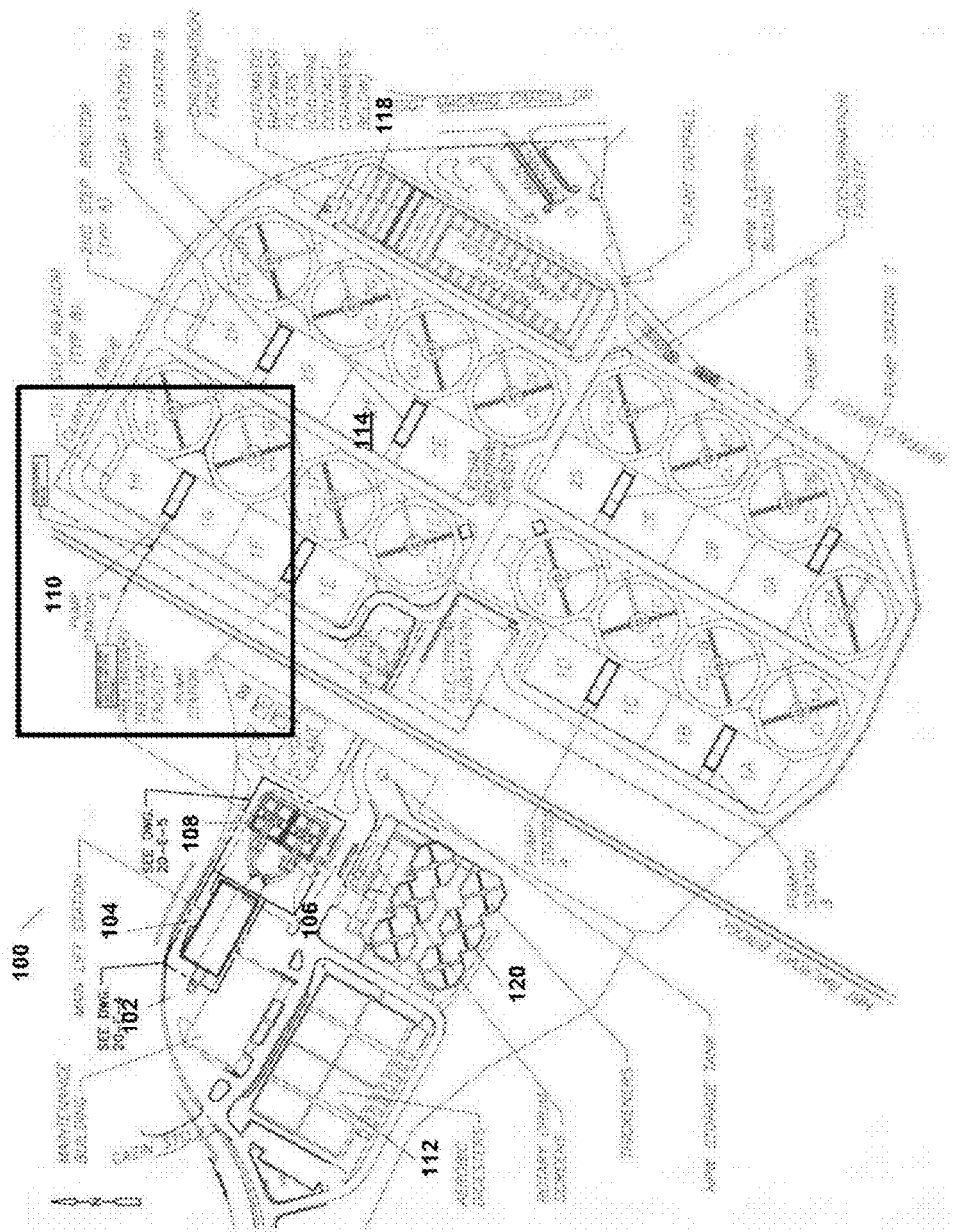

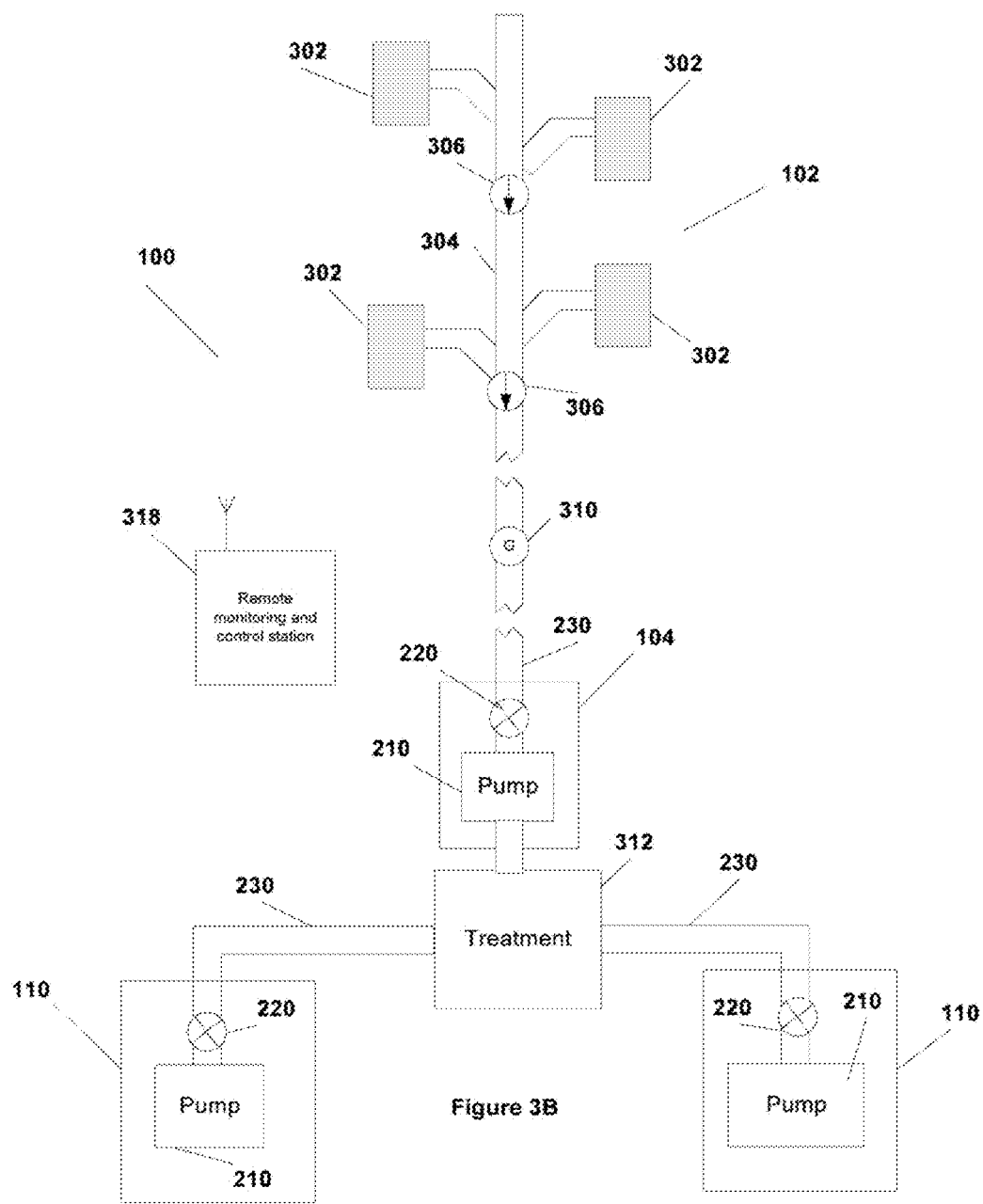
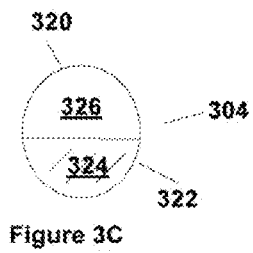
Figure 3B
Figure 3C

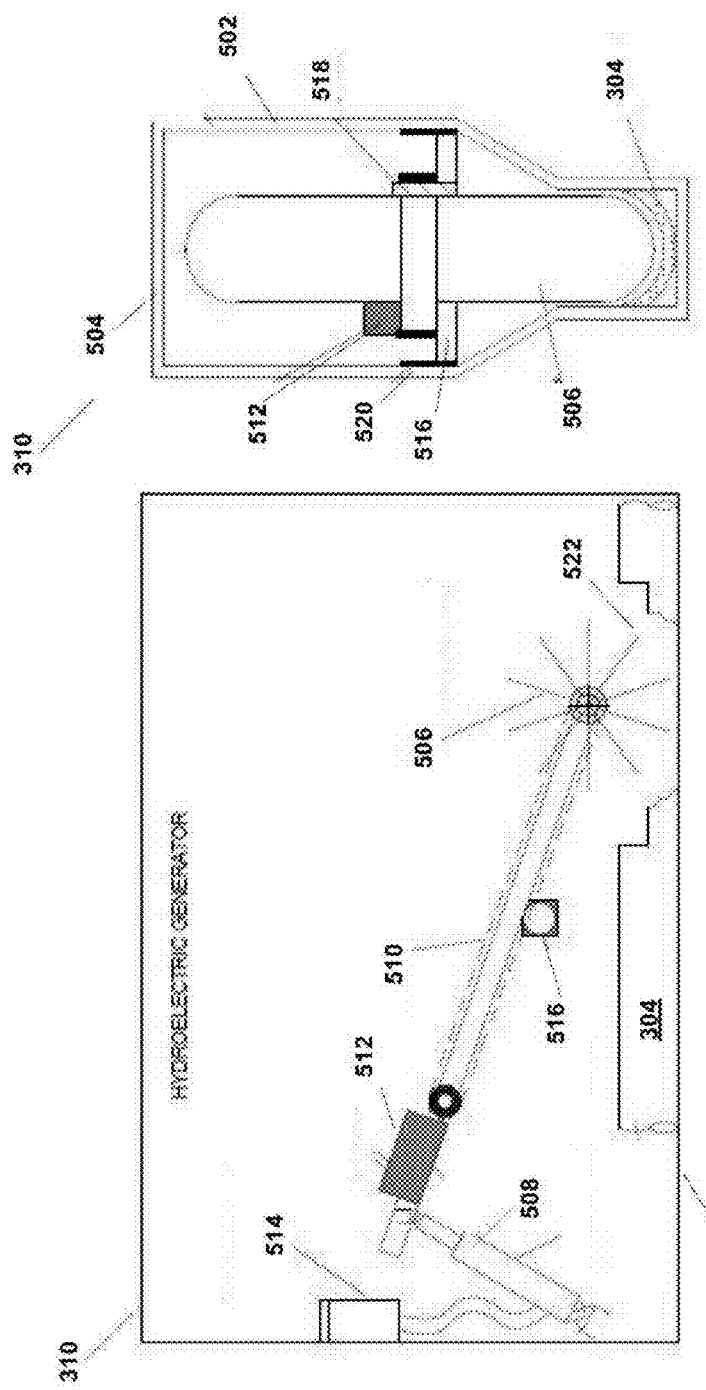

FULL-FLOW WASTEWATER SEWER SYSTEMS

RELATED APPLICATIONS

This application claims priority to U.S. Provisional Application No. 61/590,201 entitled "Full-Flow Wastewater Sewer Systems," filed on Jan. 24, 2012, which is herein incorporated by reference in its entirety.

BACKGROUND

1. Field of Invention

The embodiments described herein relates to a full-flow wastewater sewer system.

2. Discussion of Related Art

Millions of tons of wastewater flow is going untapped in city sewage systems throughout the US and the world. With today's need to conserve energy, renewable energy producing products are vital to protect our modern lifestyle and more importantly our planet. The wastewater flow currently in our sewage systems is currently uncontrolled throughout the system, resulting in premature deterioration of equipment and uncontrolled gaseous discharge.

Therefore, there is a need for improved systems to control and manage the flow of wastewater in wastewater sewage system.

SUMMARY

In accordance with aspects of the present invention, a sewage system is presented. A wastewater sewage system according to some embodiments can include a sewage pipe; a pump; and a flow control valve coupled between the sewage pipe and the pump, the flow control valve controlling the flow of wastewater such that the sewage pipe is substantially full. In some embodiments, a sewage system includes a treatment facility; one or more sewage lines coupling sewage sources to the treatment facility; and one or more pumping stations coupled between the one or more sewage lines and the treatment facility, the one or more pumping stations including flow control valves.

In some embodiments, a method of operating a sewage system includes controlling the flow of sewage through sewage lines such that the sewage system is maintained as a full-flow system; and treating the sewage from the sewage lines. Some embodiments can include a hydroelectric generator that generates power from flow of sewage through the sewage pipes.

These and other embodiments are further discussed below with respect to the following figures.

BRIEF DESCRIPTION OF THE DRAWINGS

FIGS. 1A and 1B illustrate examples of wastewater treatment facilities.

FIG. 3B illustrates a flow control system for a sewage system as illustrated in FIG. 1A.

FIG. 3C illustrates a cross section of sewage pipe.

FIGS. 5A and B illustrate a power generator.

Figure 1A:
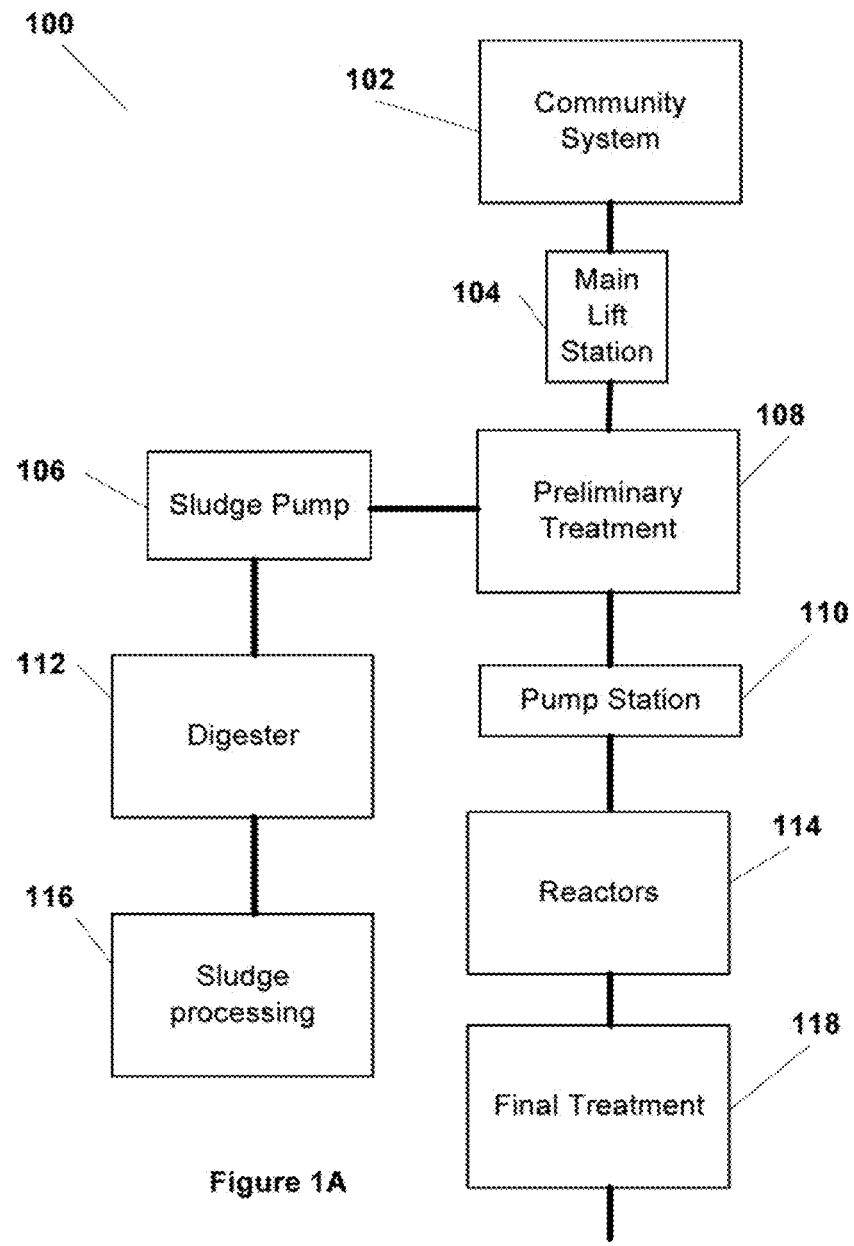

Where appropriate, elements having the same or similar functions have the same element designation. Figures are not to scale and do not illustrate relative sizes.

DETAILED DESCRIPTION

The aspects and embodiments of the invention disclosed herein relate to a sewage system facility. In particular, the disclosure relates to a full flow capacity operation of a wastewater sewer system.

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various mechanical, compositional, structural, and operational changes may be made without departing from the spirit and scope of this description and the claims. In some instances, well-known structures and techniques have not been shown or described in detail in order not to obscure the invention.

Additionally, the drawings are not to scale. Relative sizes of components are for illustrative purposes only and do not reflect the actual sizes that may occur in any actual embodiment of the invention. Like numbers in two or more figures represent the same or similar elements.

Further, this description's terminology is not intended to limit the invention. For example, spatially relative terms—such as "beneath", "below", "lower", "above", "upper", "top, "bottom", and the like—may be used to describe one element's or feature's relationship to another element or feature as illustrated in the figures. These spatially relative terms are intended to encompass different positions (i.e., locations) and orientations (i.e., rotational placements) of a device in use or operation in addition to the position and orientation shown in the figures. For example, if a device in the figures is turned over, elements described as "below" or "beneath" other elements or features would then be "above" or "over" the other elements or features. Thus, the exemplary term "below" can encompass both positions and orientations of above and below. A device may be otherwise oriented (rotated 90 degrees or at other orientations) and the spatially relative descriptors used herein interpreted accordingly. Likewise, descriptions of movement along and around various axes includes various special device positions and orientations. In addition, the singular forms "a", "an", and "the" are intended to include the plural forms as well, unless the context indicates otherwise. And, the terms "comprises", "comprising", "includes", and the like specify the presence of stated features, steps, operations, elements, and/or components but do not preclude the presence or addition of one or more other features, steps, operations, elements, components, and/or groups. Components described as coupled may be electrically or mechanically directly coupled, or they may be indirectly coupled via one or more intermediate components.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Waste water treatment facilities use multi-stage processes designed to receive a communities liquid or semi-liquid waste products and produce clean water and safe solid materials. The clean water can be safely discharged into rivers and streams while the solid materials can be sent to landfills, used as fertilizers, or disposed of in other fashions.

FIG. 1A illustrates an example wastewater sewer system 100. As shown in FIG. 1A, Sewage is collected in community system 102, which is the community wide collection of sewer lines between sewer system 100 and each source of sewage in the community. All of the sewage in community system 102 is collected and fed through one or more pumping stations (lift stations) 104 to a preliminary treatment facility 108. Pumping station 104 is a preliminary pumping station, often referred to as a lift station, that controls the flow into preliminary treatment 108. Preliminary treatment 108 separates the solid waste from liquid waste. Solid waste is removed by a sludge pump 106 into a digester 112. From digester 112, the solid materials are input to sludge processing 116. Digester 112 may be an anaerobic or an aerobic digester. Sludge processing 116 may be a sludge drying field where processed sludge is collected and removed.

The liquid waste separated out in preliminary treatment 108 can be pumped by a pump station 110 into reactors 114. Reactors 114 can include a multi-step process for treating the liquid waste. After reactors 114, a final treatment 118 may be performed before the cleaned water is discharged.

FIG. 1B illustrates a detailed example of a wastewater sewer system 100. As is illustrated in FIG. 1A, community sewage 102 is input at a main lifting station 104. A preliminary treatment 108 separates the solid sludge from the liquid waste. As shown in FIG. 1B, the sludge is pumped by sludge pump 106 into a solid treatment facility 120 that includes screens and thickening tanks before being processed into digesters 112. The liquid waste can be pumped by multiple pump stations 110 into reactors 114. In the example illustrated in FIG. 1B, there are multiple pumping stations 110 along with lift pumping station 104. Further, reactor 114 includes a two-step reactor system followed by a final treatment 118 that includes further filtering. The multiple pump stations 110 manage fluid flow between various components.

Therefore, according to some embodiments of the present invention one or more of pump stations 110 and pumping station 104 can include flow control. Flow control can be included with any or all of the pumping stations in sewer system 100. Further, backflow valves can be utilized in community system 102 to prevent backflow of sewage.

Figure 2:
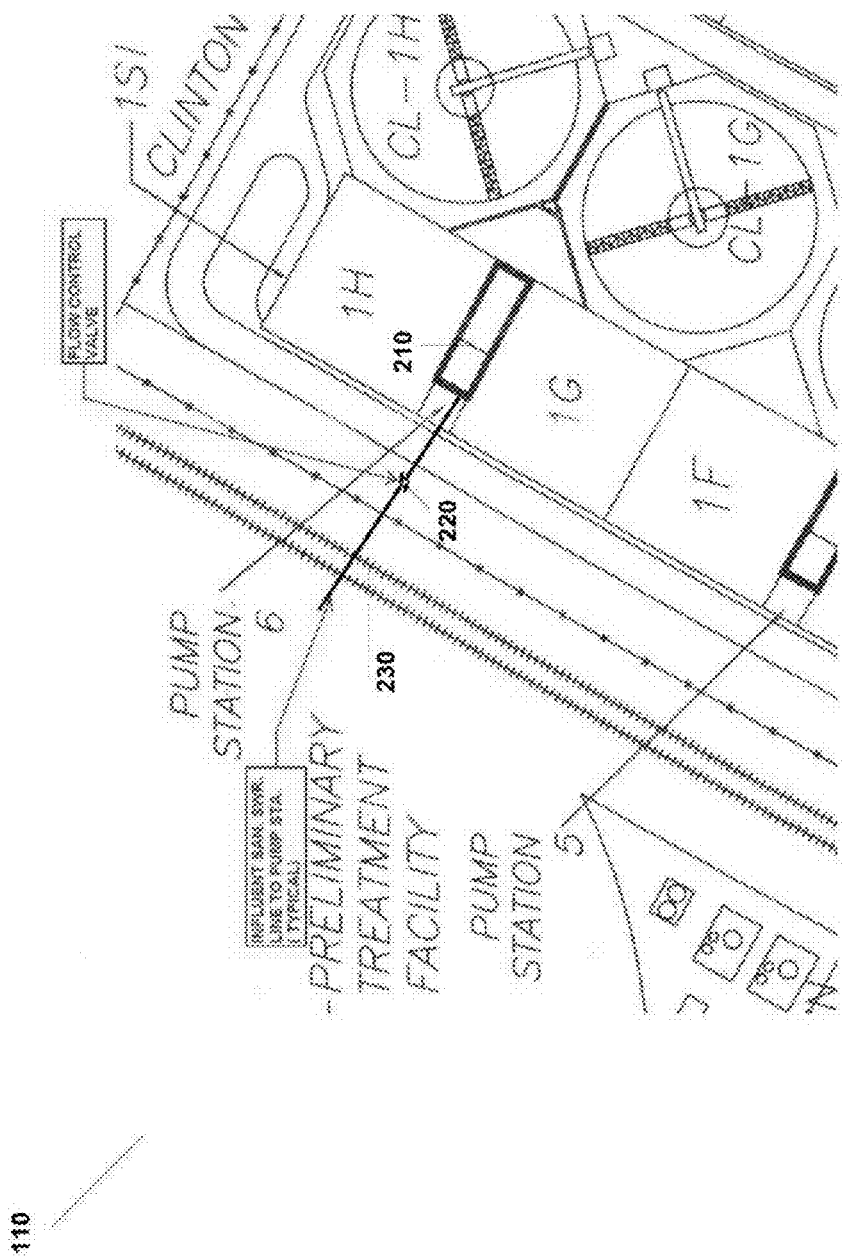
FIG. 2 illustrates a section of the example wastewater treatment facility illustrated in FIG. 1.

FIG. 2 illustrates in further detail a pumping station 110 according to some embodiments of the present invention. As shown in FIG. 2, pumping station 110 includes a pump 210 and a valve 220. Valve 220 can be used to control the water levels in sewage pipe 230. In particular, valve 220 can be controlled such that sewage pipe 230 is substantially full so that system 100 becomes a full-flow system.

Figure 3A:
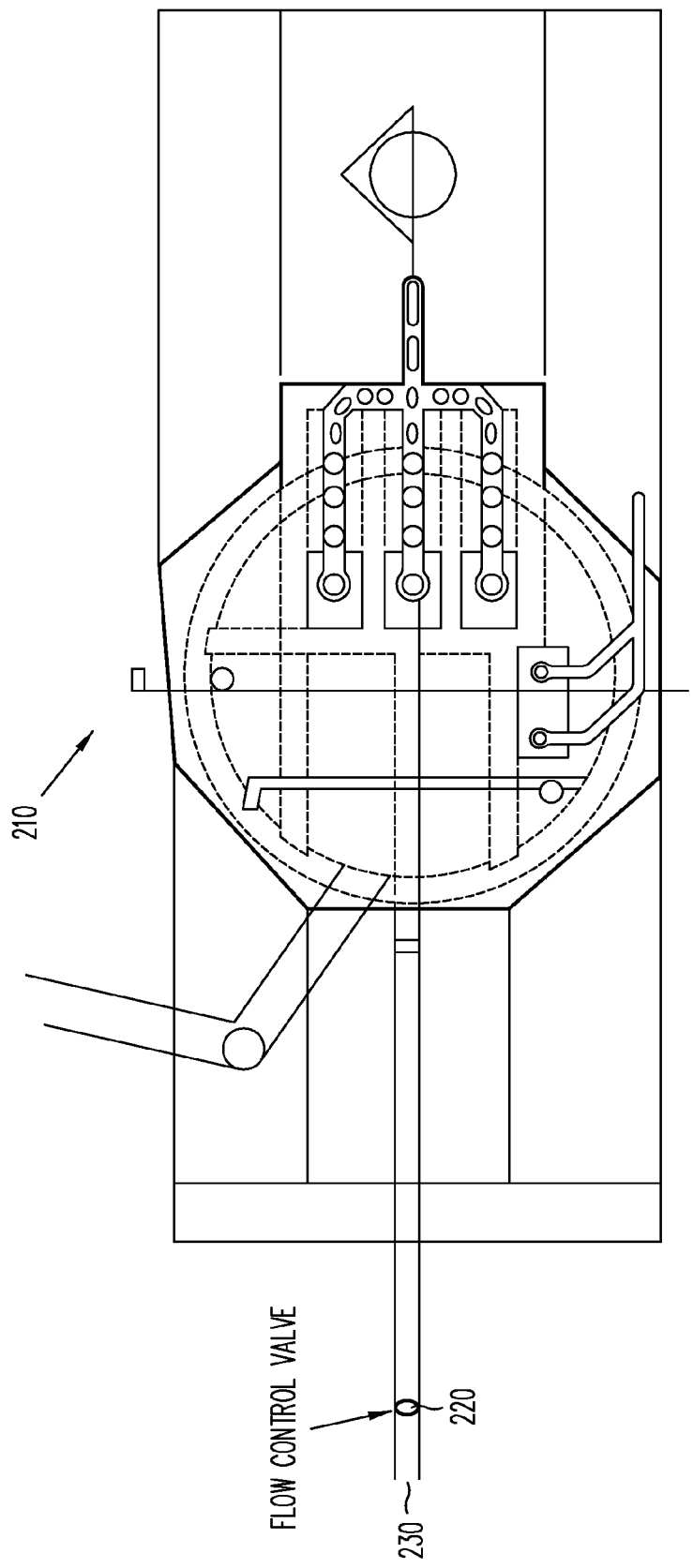
FIG. 3A illustrates a flow control valve and pumping station utilized in the section illustrated in FIG. 2.

FIG. 3A illustrates an expanded view of a pump station 200, which may be one of pump stations 110 or may be a lift station such as lift pumping station 104. As shown in FIG. 3, pumping station 200 includes a sewage pipe 230, a valve 220, and a pump 210. Pump 210 can be any pump typically used in a sewer system pumping station. Sewage pipe 230 carries the influent to pumping station 110. Flow control valve 220 controls the water level in sewage pipe 230, and therefore controls the flow of water through sewage pipe 230. According to some embodiments of the present invention, flow control valve 220 is controlled to arrange that sewage system 100 is a full-flow capacity sewage system. In accordance with some embodiments of the present invention, pumping stations 110 and lift station 104 can control the flow such that community system 102 is at full-flow capacity by maintaining the sewage pipes in community system 102 at full capacity.

There are multiple benefits to changing the standard operating flow in the wastewater sewer system 100 to full flow capacity operation. Changing the standard operational flow of one of today's city wastewater sewer systems from its normal operating flow running ⅓ to ½ pipe line capacity of wastewater, to operate at a full flow capacity of the sewage piping systems, can create profit cost savings benefits by extending the life span of sewer line piping and structural materials that are exposed to the sewage. A full-flow capacity system can minimize or practically eliminate a huge environmental impact created by today's sewer system design—emission of odorous gasses—and may allow many other benefits. In some cases, wastewater sewer systems operating with full flow design in our city sanitary sewer systems may turn a cost deficit to cities into a cost savings situation while creating numerous benefits to the wastewater sewer systems, without changing the normal amount of sewage treated in its standard operations of sewer treatment plants on a daily basis. This could result in significant savings across our nation and the world.

Additionally, a full capacity flow design may further minimize or practically eliminate most of the environmental impact of odor of the many thousands of cubic feet of volatile gases created in the sewer system and released into the atmosphere. A full capacity system may result in the reduction of the air/sewage interface, keeping a more anaerobic environment resulting in less emission of odorous gasses. Odors are generated in varying degrees throughout a typical wastewater sewer system. Odors that are generally associated with sewer systems include hydrogen sulfide, ammonia, sulfur dioxide, and other volatile gases created within the sewer system.

As shown in FIG. 3A, sewer system 100 can be operated at full-flow capacity with the automated use of valves 220, which may be, for example, a sluice gate valve style automatic control dam. Valve 220 can then allow and regulate the flow at the bottom of sewer line 230, keeping sewer line 230 basically running at full-flow capacity. To prevent sewer backups into residents or other buildings, backflow preventers can be installed in appropriate places in sewer line 230, for example near homes or businesses. Sewer line 230 can be full while maintaining the same amount of flow to the sewage treatment plant 100 as today's standard operational systems.

FIG. 3B illustrates a flow control system according to some embodiments of the present invention. As shown in FIG. 3B, community system 102 includes sources 302 coupled to sewer pipe 304. Backflow preventers 306 can be placed in sewer pipe 304 in order to prevent backflow of sewage into sources 302. Lift pump 104 pumps the sewage into treatment section 312, which has been discussed above. Pumping stations 110 can pump the liquid waste from treatment 312 into further treatment. In accordance with the present invention, pumping stations 104 and pumping stations 110 can each include flow control valves 220 that control the flow through community system 102.

The placement of automated controlled valves 220 allows for the maintenance of a full flow system throughout community system 102. Controlling valves 220 at timed set intervals can provide for automatic flushes of sewage system 100 to keep any solids from building up in community system 102. Valves 220 can, for example, be controlled by a remote monitoring and control station 318.

Placement of backflow preventers 306 can be determined by engineering depending on the design layout of community system 102 in order to prevent backflows. The most likely place to install the automated flow control dams creating a full flow system, may be at the affluent of a lift Station 104 normally installed at the end of a sewer drainage system or just before the sewer lines enter the treatment plant. FIG. 3B illustrate a control sluice gate dam valve 220 placement near the wet well lift station pump 210 of lift station 104 as well as at pumping stations 110, and or a wet wells before the wastewater enters the treatment plant. Valves 220 of each of pumping stations 104 or 110 can be controlled by a central controller in order to maintain the whole sewer system 100 at a full flow capacity.

FIG. 3C illustrates a cross section of sewage pipe 304 as shown in FIG. 3B. As shown in FIG. 3C, sewage pipe 304 is partially filled with sewage 324, leaving an air gap 326. The top portion 320 of sewage pipe 304 is exposed to the air gap 326 while the bottom portion of sewage pipe 304 is exposed to sewage 324. In a full flow system according to some embodiments of the present invention, the level of sewage 324 in pipe 304 such that sewage 324 substantially fills pipe 324, leaving substantially no air gap 326 and therefore substantially no top port 320 exposed to air gap 326.

A full-flow system can eliminate dry rotting of piping materials caused by oxidation in air gap 326 exposed to the top portion 320 of pipe 304 in today's standard operational systems. Air gap 326 further allows volatile methane and other gas build-up caused by aeration of evaporating sewer water in sewage 324. Oxidation allows sewer gases to form from the evaporation of water and the many house-hold chemicals that escape into air gap 326 and ultimately into the atmosphere through the sewer system manhole entryways. In a conventional system, these gases constantly occupy the void air gap 326 exposed to the top portion 320 of sewer line 304 that is above the water line of sewage 322. The gases cause more deterioration by accelerating dry rot by attacking the piping materials in top portion 320, which is above the sewer wastewater flow line of the sewer pipe lines in the normal operating capacity of present sewer systems. The amount of sewer gases generated in the sewer system depends on the distance a gallon of water travels through the sewer pipe 304. The longer the distance, the more oxidation of this gallon of water results, releasing gases from the wastewater and household chemicals to the atmosphere in air gap 326.

Proof that a full flow system, one with substantially no air gap 326, can extend the lifespan and costs savings of the piping and structural materials normally used in today's sewer systems is found in the inspections of a vast majority of time-aging sewer lines. In such cases, it is found that the top portion 320 of sewer line 304, the part that is typically above the water flow line and exposed to air gap 326, can be badly deteriorated, regardless of the piping materials. Contrarily, the bottom portion 322 of pipe 304 is still in a good solid condition and may last many years longer than the top portion 320 of the pipe 304. This deterioration of the top portion 320 of pipe 304 causes the operational cost of sewer pipe 304 to be increased due to the need to prematurely repair or replace those pipes while the bottom portion 322 of pipe 304 is still in good condition.

Operating the sewer system at full capacity, with substantially no air gap 326, can also help create a barrier for infiltration of storm water runoff leaching into the sewer system thru leaky manhole covers and over-loading the sewage system 100. Such storm run-off causes many thousands of gallons of untreated sewer wastewater to enter our streams and rivers from the influent of treatment plants each year. Such overflow can cause a huge environmental impact across our nation and the world.

Valves 220 in pumping stations 104 and 110 can be controlled either separately or in cooperation. Valves 220 can be, for example, mechanical sluice gates. Sluice gates are fluid control products that provide a mechanical means of controlling liquid flow through an opening and can be used in a variety of applications within the water and wastewater industry.

Figure 4:
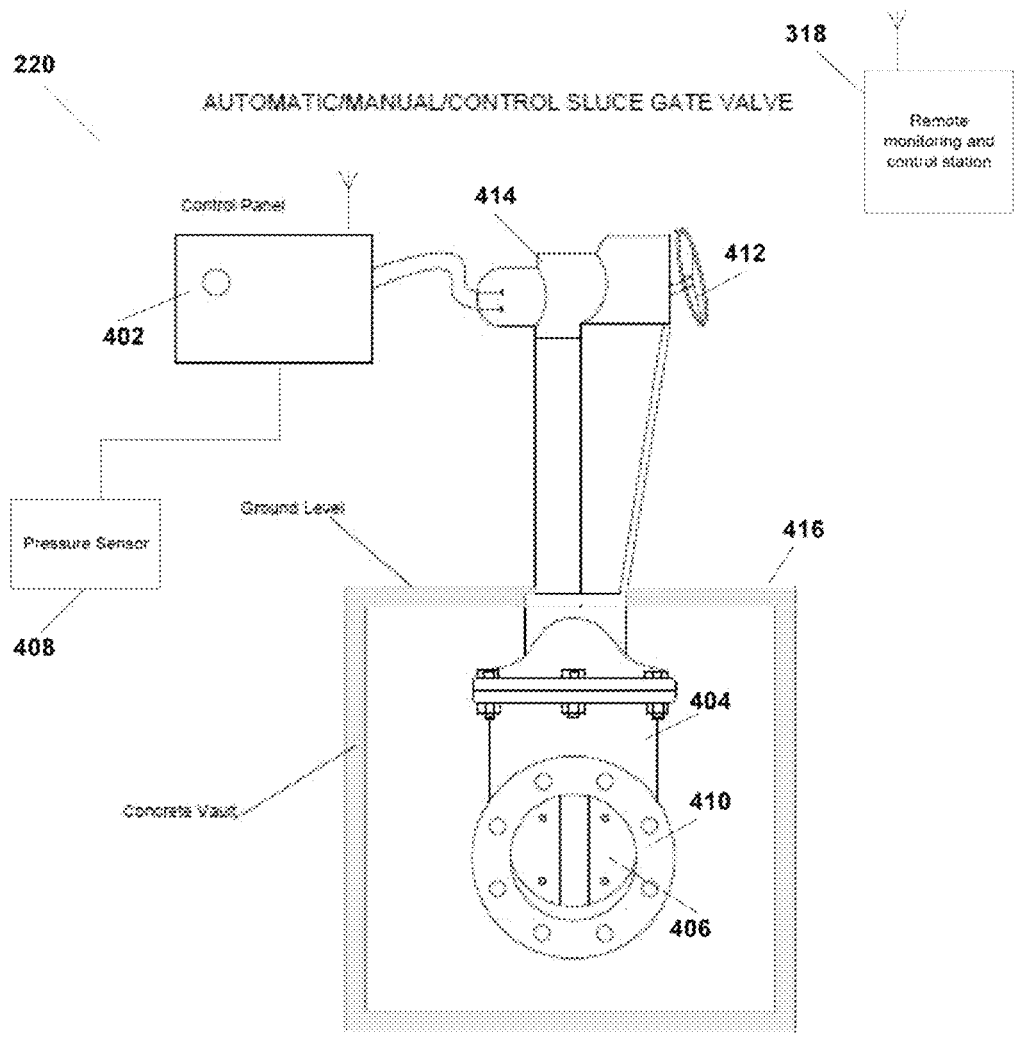
FIG. 4 illustrates a flow control valve.

FIG. 4 illustrates an example of flow control valve 220. Flow control valve 220 illustrated in FIG. 4 is an automatic or manually operated sluice gate flow control valve. As shown in FIG. 4, valve 220 can include a valve body 404 with a sluice gate 406 that can be moved (for example raised and lowered or rotated) to open and close valve 220. Sluice gate 406 can be controlled mechanically with mechanical actuator 412 and can be controlled electromechanically with electromechanical actuator 414. Valve body 404 can include a flange 410 that is coupled to sewer pipe 304, for example. As shown in FIG. 4, valve body 404 can be positioned in a vault 416 that is embedded in the ground while motor and mechanical control 412 extend above ground.

Electromechanical actuator 414 can be driven and controlled by controller 402. Controller 402 can be programmed to maintain a predetermined pressure setting with the use of a water pressure sensor 408 that measures the pressure on the upstream side of valve body 404. When the pressure is above a first threshold level, controller 402 drives electromechanical actuator 414 to open sluice gate 406 and release some of the water pressure. Conversely, if there is less pressure than a second threshold level, which is typically less than the first threshold level, controller 402 can drive electromechanical actuator 414 to close sluice gate 406 until the first threshold level is again achieved.

In some embodiments, controller 402 can be equipped to communicate with a system control station 418. Communications can be achieved with a cellular service, other available transmitters, or a wired communication to transmit the flow operating levels to remote monitoring system control station 418. Controller 402 can be controlled through remote monitoring system 418, which can control all of the valves 212 to better control and flush the flow through sewer system 100. As discussed above, body 404 can also be manually operated and controlled if necessary in order to perform sewer maintenance operations.

In some embodiments, as illustrated in FIG. 3B, a sewer line power generation system 310 can be included. Hydropower has been used to generate power for a long time and remains one of the largest sources of renewable energy in the US. Large scale hydropower accounts for about 6% of the US electricity generation. Globally, hydroelectric power accounts for around 20% of the energy used. Millions of tons of wastewater is currently being untapped in a city sewage water system through the US and the world. One system described in U.S. Pat. No. 7,429,803 (the '803 patent), which is herein incorporated by reference in its entirety, discloses a power generation system that can be utilized in conventional wastewater sewage system.

As shown in FIG. 3B, one or more generators 310 can be inserted into sewer pipe 304. Generators 310 can be used to generate power to operate system 100 or may be coupled to a power grid to generate power more generally.

FIGS. 5A and 5B illustrates an example of a generator 310 that can be used in a sewer system 100 according to some embodiments of the present invention. FIG. 5A shows view of generator 310 along the length of a portion of sewer pipe 304. FIG. 5B illustrates a view across a cross section of sewer pipe 304 at the position of generator 310.

The hydroelectric Generators (HEG) 310 illustrated in FIGS. 5A and 5B is housed in its specially designed concrete shaft or vault 502, which can be equipped with a removable man way entry access lid cover 504 for maintenance and installation. Vault 502 can be fitted over sewer pipe 304, with the top half of the sewer pipe 304 cut out in a cut-out section 522 and adapted to the generator vault 502 to accommodate and engage generator turbine vanes 506 with the force and power of the flow of sewer water through sewer pipe 304. The water flow, in its gravitating to the treatment plant, turns the generator turbine vanes 506 and drives generator 512 to produce usable electricity that can be connected to a power grid, which is usually nearby or running in the same easements as the sewer lines.

Turbine vanes 506 lowering into the flow of the sewer line can be automatically controlled by a predetermined setting of an electric actuator 508. Controller 514 can include a cellular type or other available transmission system can report and control the position of the turbine vanes 506 in the power flow of the water in sewer pipe 304. Controller 514 can lower or raise turbine vanes 506 out of the flow of the sewer line 305 using actuator 508 as needed. Turbine vanes 506 may be raised, for example, for maintenance purposes or to a level operated at the systems control room when necessary. Controller 514 can be equipped with manual switch and a rechargeable battery backup to lower and raise the turbine vanes in the event of a power failure.

As shown in FIG. 5A, turbine vanes 506 can be mechanically coupled to electrical generator 512 with a chain drive 510. As shown in FIG. 5B, chain drive 510 can be driven by a chain sprocket 518 mechanically attached to turbine vanes 506. HEG 410 is mounted to pivot on pivot 516 so that actuator 508 can raise and lower turbine vanes 506.

HEG generator 310 as described above can be included on the upstream side of flow control valve 220 in order to capture power through the flow of wastewater sewage in system 100. Further, power generators can be provided at various locations in pipe 230 in order to capture the energy from the flow of sewage water through system 100.

One skilled in the art will recognize variations of embodiments of the invention described here. Those variations are intended to be within the scope of this disclosure. As such, the invention is limited only by the following claims.

I claim:

1. A wastewater sewage system, comprising:
   a pump coupled in a wastewater path between a preliminary sewage treatment facility and a liquid waste treatment reactor, for pumping wastewater into the liquid waste treatment reactor, the preliminary sewage treatment facility being for separating solid waste from liquid waste, the liquid waste being said wastewater;
   a sewage pipe coupled between the preliminary sewage treatment facility and the pump, for carrying the wastewater to the pump; and
   a flow control valve coupled between the sewage pipe and the pump, the flow control valve comprising:
   a pressure sensor for measuring a water pressure in the sewage pipe, the water pressure indicating a wastewater level in the sewage pipe;
   a controller for opening the flow control valve when the pressure sensor senses the water pressure as being above a first threshold level, and for closing the flow control valve when the pressure sensor senses the water pressure as being below a second threshold level no greater than the first threshold level, thereby controlling a water into the pump in response to the water pressure in the sewage pipe, to maintain the pressure in the sewage pipe within a predetermined range such that the sewage pipe is substantially full.

2. The system of claim 1, wherein the pump is a lift pump.

3. The system of claim 1, wherein the flow control valve includes:
   a valve body that houses a sluice gate;
   a mechanical actuator for operating the sluice gate; and
   an electromechanical actuator for operating the sluice gate.

4. The system of claim 1, further including a hydroelectric generator coupled into the sewage pipe.

5. The system of claim 4, wherein the hydroelectric generator includes:
   turbine vanes positioned to intercept a fluid flow in the sewage pipe and
   an electrical generator driven by the turbine vanes during operation.

6. The system of claim 5, wherein the turbine vanes are inserted through a cut-out section of the sewage pipe and are coupled to the electrical generator with a chain drive.

7. The system of claim 6, further including an actuator for raising and lowering the turbine vanes in the sewage pipe.

8. The system of claim 1, wherein the flow control valve is configured to automatically flush the system at timed set intervals.

* * * * *